United States Patent
Niwa et al.

(10) Patent No.: US 7,509,211 B2
(45) Date of Patent: Mar. 24, 2009

(54) APPARATUS FOR ESTIMATING OF DEVIATION FROM LANE, AND APPARATUS FOR WARNING OF SAME AND METHOD FOR SAME

(75) Inventors: Satoru Niwa, Susono (JP); Katsuhiko Iwazaki, Numazu (JP); Seiji Kawakami, Susono (JP); Hiroaki Kataoka, Susono (JP); Chumsamutr Rattapon, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 871 days.

(21) Appl. No.: 11/136,449

(22) Filed: May 25, 2005

(65) Prior Publication Data

US 2005/0273261 A1    Dec. 8, 2005

(30) Foreign Application Priority Data

Jun. 2, 2004    (JP)    ............................. 2004-165037

(51) Int. Cl.
*G08G 1/16*    (2006.01)

(52) U.S. Cl. ...................... 701/205; 701/301; 340/901; 340/905

(58) Field of Classification Search .................. 701/301
See application file for complete search history.

(56) References Cited

U.S. PATENT DOCUMENTS

| | | | |
|---|---|---|---|
| 5,765,116 A | 6/1998 | Wilson-Jones et al. | |
| 6,212,453 B1 | 4/2001 | Kawagoe et al. | |
| 6,256,561 B1 | 7/2001 | Asanuma | |
| 6,970,787 B2 * | 11/2005 | Matsumoto et al. | 701/301 |
| 7,295,683 B2 * | 11/2007 | Yamamoto et al. | 382/104 |
| 2002/0041229 A1 * | 4/2002 | Satoh et al. | 340/438 |
| 2004/0186650 A1 * | 9/2004 | Tange et al. | 701/96 |
| 2004/0186651 A1 * | 9/2004 | Tange et al. | 701/96 |
| 2004/0193374 A1 * | 9/2004 | Hac et al. | 701/301 |
| 2004/0252020 A1 * | 12/2004 | Matsumoto et al. | 340/438 |
| 2005/0273261 A1 * | 12/2005 | Niwa et al. | 701/301 |

FOREIGN PATENT DOCUMENTS

| | | |
|---|---|---|
| DE | 199 43 410 A1 | 5/2000 |
| DE | 199 48 913 A1 | 5/2000 |
| JP | A 7-105498 | 4/1995 |
| JP | A 2001-010518 | 1/2001 |
| JP | A 2001-176000 | 6/2001 |
| JP | A 2004-070383 | 3/2004 |

\* cited by examiner

*Primary Examiner*—Thomas G Black
*Assistant Examiner*—Shelley Chen
(74) *Attorney, Agent, or Firm*—Oliff & Berridge, PLC

(57) ABSTRACT

An apparatus for warning deviation from a lane has a deviation evaluation ECU 1. The deviation evaluation ECU 1 has a deviation evaluator 14 for performing an evaluation on a deviation by comparing a future position of a host vehicle with a lane future position. Before this deviation evaluation, a mask processor 13 determines whether a yaw angle of the host vehicle and a lateral position of the vehicle relative to a driving lane exceed their respective thresholds preliminarily determined. When either one or the both are not more than the thresholds, the mask processor 13 performs a mask process, without performing the deviation evaluation. A deviation evaluator 14 performs the deviation evaluation when the yaw angle and the lateral position relative to the driving lane both exceed their respective thresholds.

8 Claims, 7 Drawing Sheets

APPARATUS FOR ESTIMATING OF DEVIATION FROM LANE, AND APPARATUS FOR WARNING OF SAME AND METHOD FOR SAME

BACKGROUND OF THE INVENTION

1. Technical Field

The present invention relates to an apparatus for estimating of deviation from lane and method estimating of a deviation from a lane and to a warning apparatus and method for issuing a warning to a driver when it is determined that there is a possibility of a deviation and, more particularly, to estimating and warning apparatus of deviation from lane and methods for estimating a deviation from a lane and for issuing a warning, in order to perform lane deviation prevention support for preventing deviation of a running vehicle from the lane.

2. Background Art

There are vehicles with a lane deviation preventing function of preventing from deviating a vehicle running on a lane of a road from the lane. An example of the conventional apparatus with such a function is a driving state evaluating apparatus, for example, disclosed in JP A 7-105498 (hereinafter referred to as Document 1). This driving state evaluating apparatus is configured to predict a deviation state on the basis of a distance to an intersection between an predicted course of a host vehicle and a boundary of a driving lane, and an angle between the predicted course and the boundaries of the driving lane (yaw angle). When this deviation evaluation results in evaluating that the vehicle will deviate from the lane, the apparatus issues a warning and automatically performs a correction for steering.

SUMMARY OF THE INVENTION

The driving state evaluating apparatus disclosed in above Document 1 uses the yaw angle for the deviation state evaluation. This yaw angle is determined from a positional relation between a camera and a driving lane by detecting boundaries of the driving lane from an image taken by the camera mounted on the vehicle. The camera is mounted in a specific angular relation with the host vehicle, and variation can occur upon mounting of the camera on the vehicle, or there are cases where learning of a reference position is not completed; the yaw angle will have an error in such cases.

In the cases where the yaw angle has an error as described above, the driving state evaluating apparatus disclosed in above Document 1 had the problem that the evaluation based on the incorrect yaw angle resulted in repeatedly activating the deviation warning more than necessary, even in the case where the host vehicle was running almost along the center of the driving lane.

An object of the present invention is therefore to provide the apparatus for estimating or warning of deviation from a lane, and methods capable of preventing frequent and excessive occurrence of deviation warning even in the case where the yaw angle has an error.

An apparatus for estimating of deviation from a lane according to the present invention to achieve the above object is an apparatus comprising course prediction means for predicting course of a host vehicle in future, driving lane recognition means for recognizing a driving lane on which the host vehicle is running, and deviation estimating means for estimating a possibility that the host vehicle will deviate from the driving lane on the basis of a relation between the predicted future course of the host vehicle and the recognized driving lane, and further comprising yaw angle detector for determining a yaw angle of the host vehicle relative to the recognized driving lane; lateral position detector for determining a lateral position of the host vehicle on the recognized driving lane; and prohibiting means for prohibiting the deviation estimating means from estimating the possibility of the deviation from the lane when an absolute value of the determined yaw angle is less than a predetermined threshold and when a distance between the determined lateral position and a center line of the driving lane is less than a predetermined threshold.

On the other hand, a method for estimating of deviation from a lane according to the present invention to achieve the above object is a method comprising the steps of predicting a course of a host vehicle in future, recognizing a driving lane on which the host vehicle is running, and estimating a possibility that the host vehicle will deviate from the driving lane on the basis of a relation between the predicted course of the host vehicle and the recognized driving lane, a method further comprising the steps of: determining a yaw angle of the host vehicle relative to the recognized driving lane; determining a lateral position of the host vehicle on the recognized driving lane; and prohibiting the estimation on the possibility of the deviation when an absolute value of the determined yaw angle is less than a predetermined threshold and when a distance between the determined lateral position and a center line of the driving lane is less than a predetermined threshold.

When the yaw angle has an error, the deviation warning may be repeatedly carried out more than necessary even if the vehicle is running at a position near the center of the driving lane. In this respect, the apparatus for warning deviation according to the present invention also has the threshold set for the deviation distance from the center of the driving lane, in addition to that for the yaw angle. For this reason, the estimation on the deviation is carried out only when there is a large lane deflection or when the vehicle is located right near the boundaries of the driving lane.

By performing a deviation warning or deviation avoidance control by means of this apparatus for estimating of deviation, it is feasible to prevent occurrence of such an event that activation of the deviation warning is repeated more than necessary or such an event as frequent intervention of the deviation avoidance control.

DESCRIPTION OF THE PREFERRED EMBODIMENT OF THE INVENTION

Figure 1:
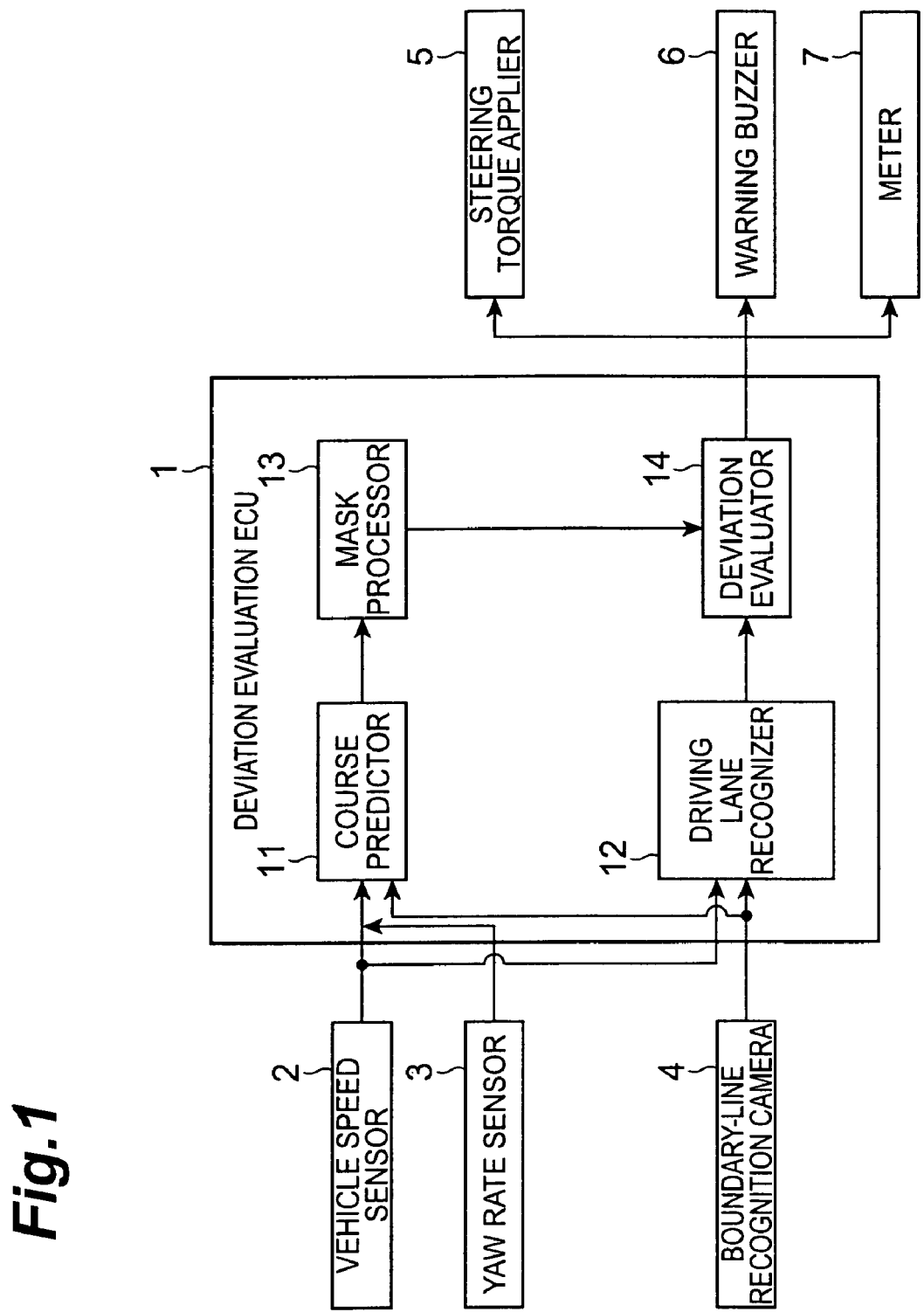
FIG. 1 is a block diagram of an apparatus for warning deviation from a lane according to the present invention.

The preferred embodiment of the present invention will be described below in detail with reference to the accompanying drawings. To facilitate the comprehension of the explanation, the same reference numerals denote the same parts, where possible, throughout the drawings, and a repeated explanation will be omitted.

FIG. 1 is a block diagram of an embodiment of apparatus for warning deviation from a lane (including apparatus for estimating of deviation from the lane) according to the present invention. As shown in FIG. 1, the apparatus for warning deviation from the lane of the present embodiment is provided with deviation evaluation ECU (Electrical Control Unit) 1. The deviation evaluation ECU 1 has a course predictor 11, a driving lane recognizer 12, a mask processor 13, and a deviation evaluator 14. Connected to the deviation evaluation ECU 1 are a vehicle speed sensor 2, a yaw rate sensor 3, and a boundary-line recognition camera 4.

Furthermore, connected to the deviation evaluation ECU 1 are a steering torque applier 5, a warning buzzer 6, and a meter 7. The steering torque applier 5 corresponds to deviation avoiding means of the present invention, and the warning buzzer 6 and meter 7 correspond to warning means of the present invention. The deviation evaluation ECU 1 evaluates whether the host vehicle will depart from a lane, based on a vehicle speed of the host vehicle outputted from the vehicle speed sensor 2, a yaw rate outputted from the yaw rate sensor 3, an image showing boundary lines, outputted from the boundary-line recognition camera 4, and so on. When the evaluation result is that the host vehicle will deviate from the lane, the ECU 1 outputs a predetermined activation signal to the steering torque applier 5, to the warning buzzer 6, and to the meter 7.

The vehicle speed sensor 2 is composed, for example, of sensors mounted on the front-wheel portions of the vehicle, which detect rotating states of wheels (wheel speeds) to detect a vehicle speed during host vehicle running. The vehicle speed sensor 2 outputs the detected vehicle speed to the course predictor 11 in the deviation evaluation ECU 1.

The yaw rate sensor 3 is, for example, a sensor mounted on the floor part in the center-of-gravity part of the vehicle, and detects a yaw rate on the vehicle. The yaw rate sensor 3 outputs the detected yaw rate to the course predictor 11 in the deviation evaluation ECU 1.

The boundary-line recognition camera 4 is, for example, a camera located at a position where it can view the scene outside and in front of the vehicle from the upper part of the windshield in the vehicle interior, and photographs the circumstances outside and in front of the vehicle through the windshield at a predetermined frame rate. The boundary-line recognition camera 4 outputs an image of the circumstances outside the vehicle thus taken, to the course predictor 11 and to the driving lane recognizer 12 in the deviation evaluation ECU 1.

The steering torque applier 5 is, for example, an electric motor in an electric power steering system (e.g., which is connected to a steering rod for transmitting a steering amount from the steering wheel to wheels). The steering torque applier 5 applies a predetermined steering torque to the steering rod, based on an activation signal outputted from the deviation evaluation ECU 1. The steering torque applier 5 applies the steering torque to the steering rod to turn the wheels to a direction to avoid a departure of the host vehicle from the lane.

The warning buzzer 6 is, for example, a buzzer provided in the instrumental panel portion in the vehicle interior, and issues a warning in a predetermined sound volume enough to reach the driver. It is preferable to prepare multiple types of sounds to come out from the warning buzzer 6, and a predetermined type of warning is outputted based on an activation signal outputted from the deviation evaluation ECU 1.

Figure 2:
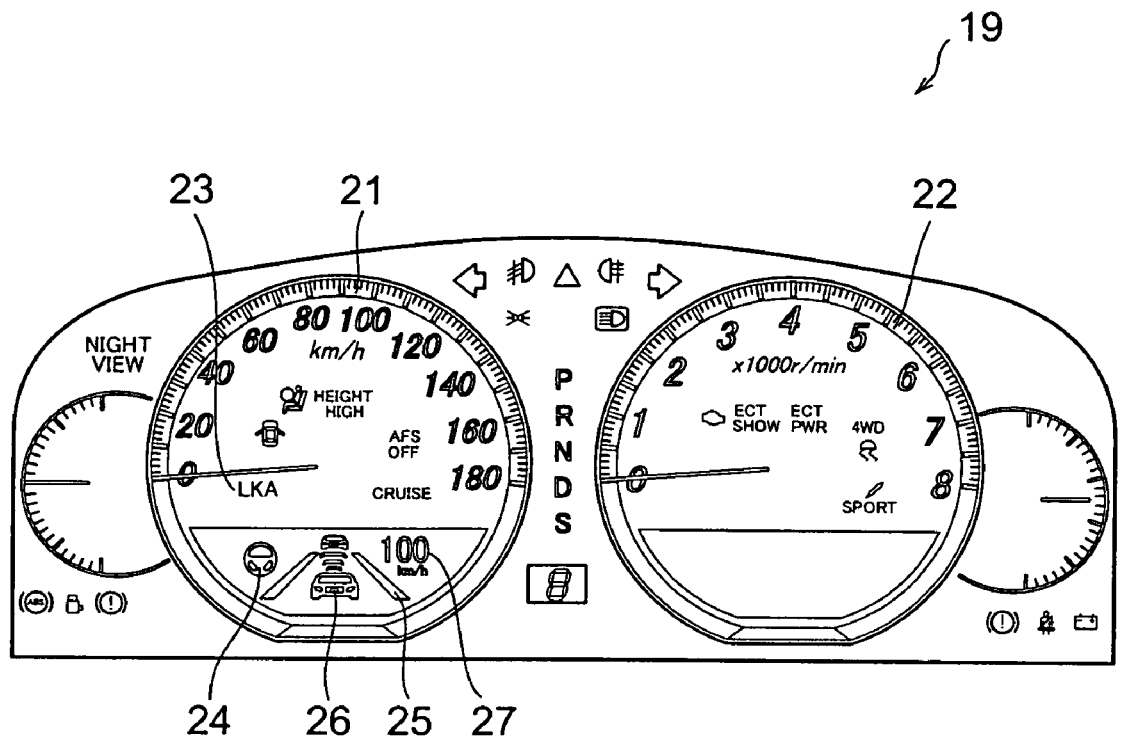
FIG. 2 is a front view of a meter.

The meter 7 is provided with a speed meter 21 and a tachometer 22, as shown in FIG. 2. The display part of the speed meter 21 provides displays of deviation prevention support execute indication 23 expressed by letters of "LKA" (Lane Keep Assist), steering control execute indication 24, boundary-line recognition indication 25, radar cruise indication 26, radar cruise set speed indication 27, and so on. These indication portions provide appropriate displays, based on a display signal outputted from the deviation evaluation ECU 1.

The course predictor 11 accepts inputs of vehicle speed information from the vehicle speed sensor 2, yaw rate information from the yaw rate sensor 3, and an image signal from the boundary-line recognition camera 4. The course predictor 11 predicts a future course of the host vehicle by predetermined image processing and arithmetic processing based on these vehicle speed, yaw rate, and image. The course predictor 11 calculates the yaw angle and lane offset amount, and outputs the yaw angle and lane offset amount together with the predicted future course to the mask processor 13. The yaw angle and lane offset amount will be described later with FIG. 5.

The driving lane recognizer 12 receives an input of an image signal from the boundary-line recognition camera 4. The driving lane recognizer 12 performs predetermined image processing and arithmetic operation on the input image to recognize a driving lane, and estimates a future position of the driving lane on which the host vehicle is running. The driving lane recognizer 12 outputs the estimated future position of the driving lane to the deviation evaluator 14.

The mask processor 13 stores a predetermined yaw angle threshold and lane offset amount threshold. The mask processor 13 compares the yaw angle or the lane offset amount outputted from the course predictor 11, with the corresponding threshold. When the result of the comparison is that the yaw angle and the lane offset amount both are greater than the respective thresholds, the mask processor 13 outputs the future course of the host vehicle outputted from the course predictor 11, to the deviation evaluator 14. A deviation distance from the center of the driving lane may be, for example, the lane offset amount, or may be one indirectly determined from a distance from a line drawn on a boundary of the driving lane. Therefore, the term "that the deviation distance from the center of the driving lane exceeds the threshold" also includes a case where the distance from the line drawn on the boundary becomes not more than a threshold.

The deviation evaluator 14 compares the future course of the host vehicle outputted from the mask processor 13, with the future position of the driving lane outputted from the driving lane recognizer 12. When the result of this comparison is that the future course of the host vehicle will be outside the future position of the driving lane, the deviation evaluator 14 outputs an activation signal to the steering torque applier 5, to the warning buzzer 6, and to the meter 7.

Figure 3:
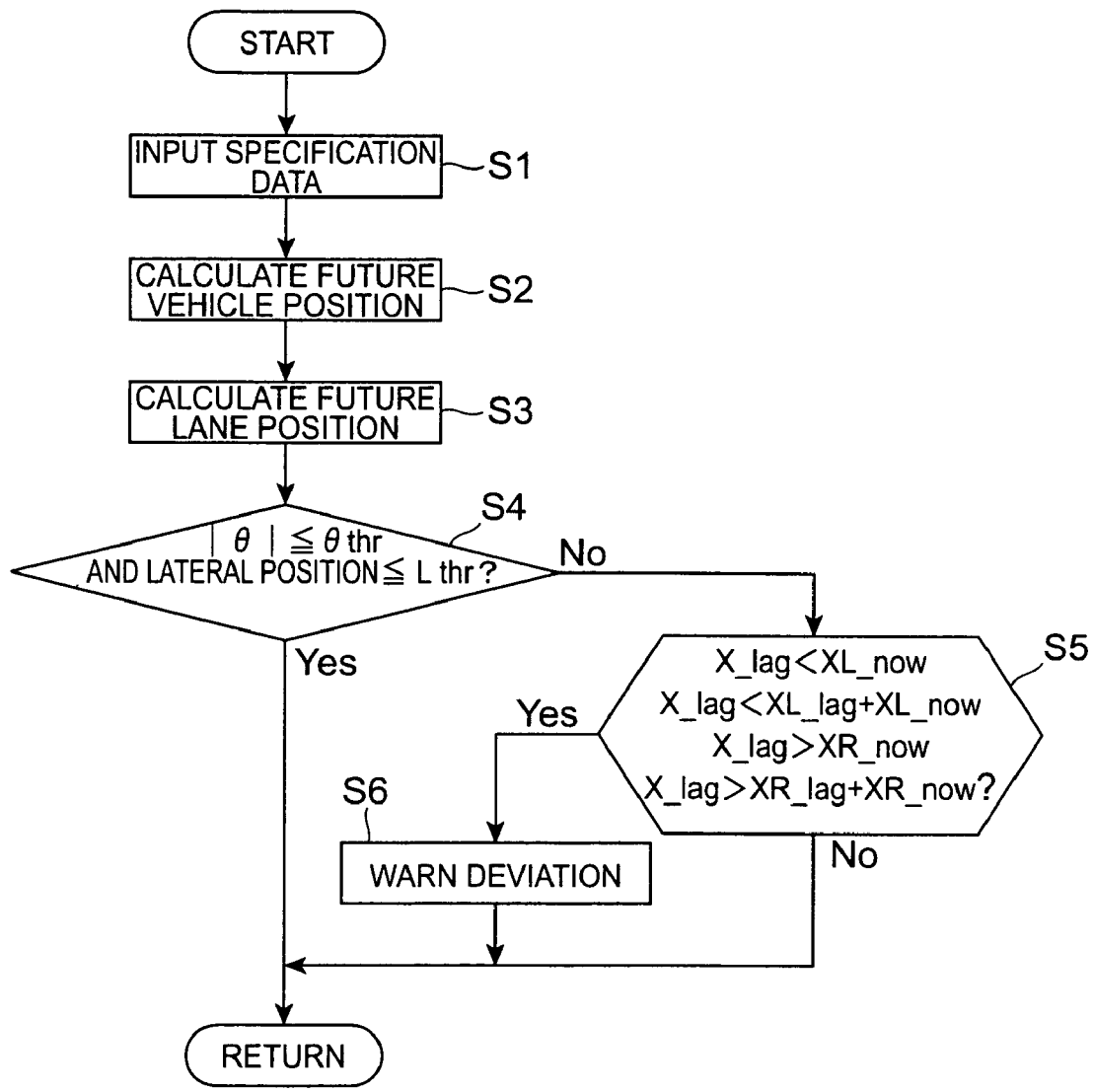
FIG. 3 is a flowchart showing a procedure of estimating deviation in the apparatus for warning deviation from the lane according to the present invention.

The following will describe a procedure of performing the deviation evaluation in the apparatus of the present embodiment having the above configuration, i.e., the methods for evaluating and warning of deviation from the lane according to the present invention. FIG. 3 is a flowchart showing the procedure of the deviation evaluation (evaluation and warning of deviation from the lane) in the deviation evaluation ECU of the apparatus according to the present embodiment.

At a start of the evaluation of deviation from the lane, specification data of the vehicle are first inputted into the ECU 1 (S1). The data of the vehicle herein include the vehicle speed from the vehicle speed sensor 2, the yaw rate from the yaw rate sensor 3, and so on. After the input of the data of the vehicle, the course predictor 11 calculates the future position of the vehicle (S2), and the driving lane recognizer 12 calculates the future position of the lane relative to the host vehicle (S3).

Figure 4:
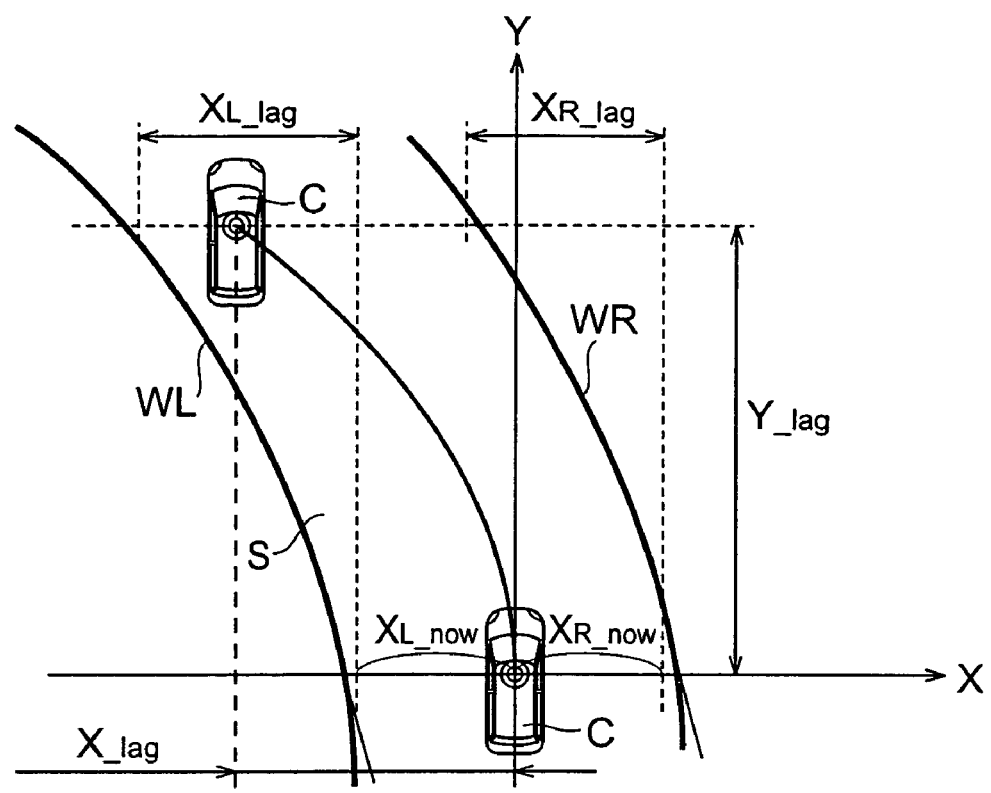
FIG. 4 is an illustration for explaining a positional relation between a host vehicle and a driving lane.

For calculating the future positions of the vehicle and lane, for example, let us suppose that the host vehicle C is traveling on a driving lane S shown in FIG. 4. A position of the host vehicle C T seconds after this state is determined as a vehicle future position (X_lag, Y_lag). The Y-coordinate Y_lag of the vehicle future position can be obtained by Eq (1) below.

$$Y\_lag = V \cdot T \quad (1)$$

The X-coordinate of the vehicle future position can be obtained by the following arithmetic expression from the vehicle speed V and the yaw rate ω.

$$X\_lag \approx VT\omega \quad (2)$$

The vehicle future position (X_lag, Y_lag) determined in this way, together with the yaw angle θ and the lane offset amount, is fed from the course predictor 11 to the mask processor 13.

After the vehicle future position (X_lag, Y_lag) is determined in this manner, a relative lane future position of the driving lane relative to the host vehicle is subsequently determined. The lane future position includes a left boundary-line relative future position (XL_lag+XL_now, Y_lag) which is a future position of a left boundary-line relative to the host vehicle, and a right boundary-line relative future position (XR_lag+XR_now, Y_lag) which is a future position of a right boundary line relative to the host vehicle, and the both are determined.

Here XL_now is a distance between the current left boundary-line and the host vehicle and is determined by image processing of the image taken by the boundary-line recognition camera 4. XL_now can be specifically determined as follows. For simplifying the description, the description will be given on the assumption that the host vehicle is traveling on a straight driving lane.

Figure 5:
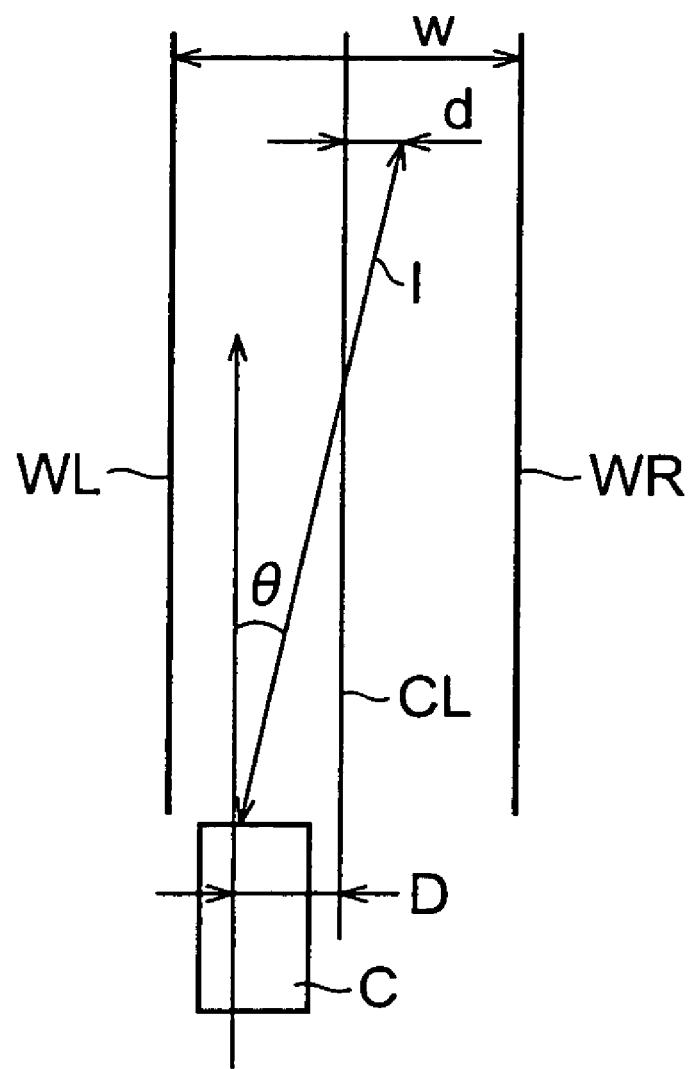
FIG. 5 is an illustration for explaining a positional relation between a host vehicle and a driving lane photographed by a boundary-line recognition camera.
Figure 6:
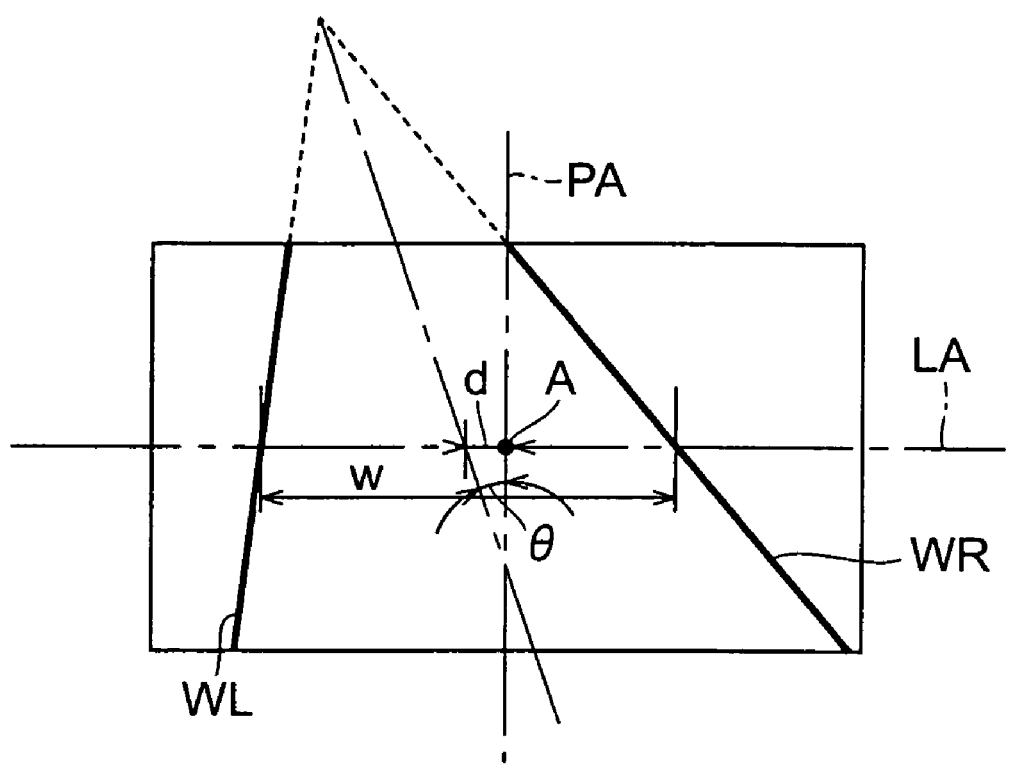
FIG. 6 is an illustration showing an example of an image taken by the boundary-line recognition camera.

As the host vehicle travels on the straight driving lane S, as shown in FIG. 5, a camera gaze point A of the boundary-line recognition camera 4 is assumed to be set at a position the camera focal point distance 1 apart ahead from the boundary-line recognition camera 4. An image taken at this time by the boundary-line recognition camera 4 shows a left boundary-line WL and a right boundary-line WR, as shown in FIG. 6. An intersection between a camera vertical axis PA and a camera horizontal axis LA in this image is the came gaze point A, and using this camera gaze point A, an offset amount d from a hypothetical center line CL at the point of the camera focal point distance 1 can be determined.

An angle between the camera vertical axis and the hypothetical center line CL is equivalent to the yaw angle θ. Therefore, using the offset amount d from the hypothetical center line CL, and the yaw angle θ, an offset amount D of the vehicle from the center line can be estimated by Eq (3) below.

$$D = d - l\theta \quad (3)$$

If the camera axis of the boundary-line recognition camera 4 is deflected on the opposite side of the hypothetical center line with respect to the longitudinal axis of the vehicle, the offset amount D is a value according to the camera deflection angle and with an opposite sign. Furthermore, each of distances from the camera vertical axis at the camera gaze point A to the left and right boundary-lines WL, WR is determined, and a lane width w of the driving lane can be determined from these distances and yaw angle θ. XL_now can be determined from these offset amount from the hypothetical center line and lane width w of the driving lane.

Furthermore, XL_lag and XR_lag both can be determined by Eq (4) below.

$$XL\_lag = XR\_lag = dr + dy \quad (4)$$

Figure 7:
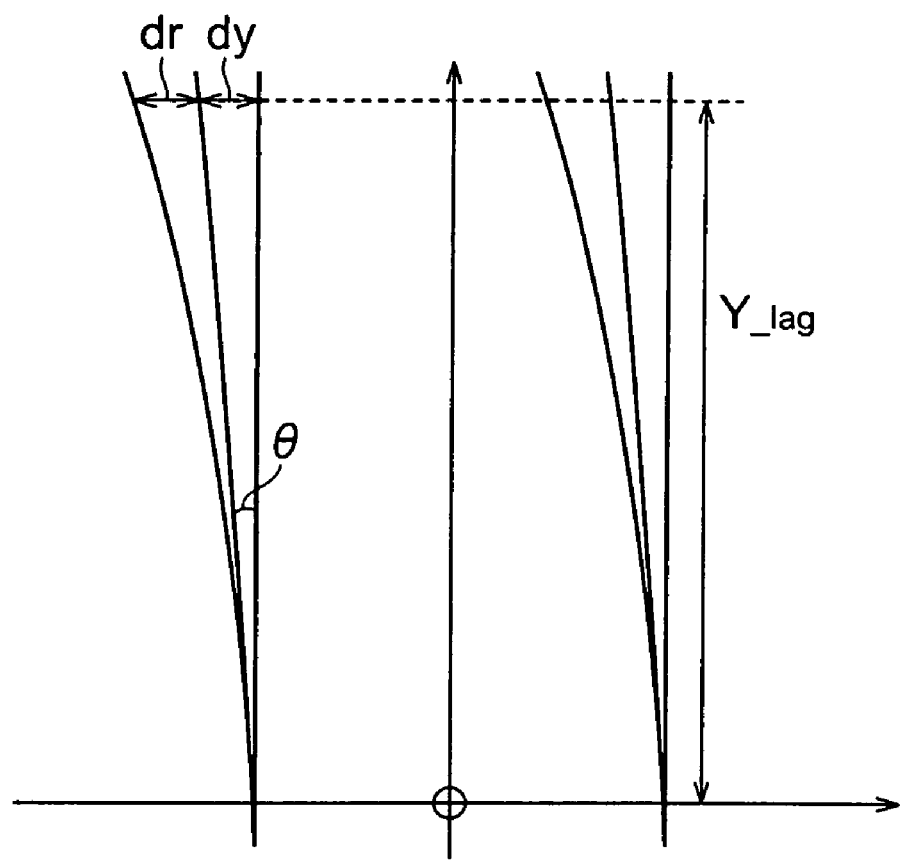
FIG. 7 is an illustration for explaining a future lane position.

In Eq (4) above, dr represents a deviation amount due to a curve with a radius R of curvature shown in FIG. 7 and can be expressed by Eq (5) below. Furthermore, dy represents a deviation amount due to the yaw angle θ and can be expressed by Eq (6) below.

$$dr = (Y\_lag)^2 / R \quad (5)$$

$$dy = (Y\_lag) \cdot \theta \quad (6)$$

After the future lane position is determined in this manner, the driving lane recognizer 12 outputs the lane future position to the deviation evaluator 14.

Then the mask processor 13 performs a mask process using the yaw angle and the lane offset amount outputted from the course predictor 11. A threshold θthr of yaw angle and a threshold Lthr of lane offset amount are preliminarily set in the mask processor 13. The mask processor 13 compares the absolute value of the yaw angle θ outputted from the course predictor 11, with the yaw angle threshold θthr preliminarily stored. The lane offset amount is determined as a lateral position relative to the lane, and this lane offset amount is compared with the lane offset amount threshold Lthr (S4). This comparison is made to determine whether the vehicle is running near the center of the driving lane (a range near the center is defined by the threshold of lane offset amount).

Specifically, the mask processor 13 determines whether the yaw angle and the lane offset amount satisfy the mask process conditions that the absolute value of the yaw angle is not more than the yaw angle threshold θthr and that the lane offset amount is not more than the lane offset amount threshold Lthr (S4). When the result of the comparison is that the mask process conditions are not met, the mask processor 13 outputs the vehicle future position to the deviation evaluator 14, and the deviation evaluator 14 performs a deviation evaluation based on a determination on the position of the lane relative to the host vehicle (S5). On the other hand, when it is determined that the above mask process conditions are satisfied, the control is terminated without performing the position determination of the lane relative to the host vehicle. Namely, the deviation evaluation is prohibited.

In the mask processor 13 herein, the predetermined threshold is set for the lane offset amount, in addition to that for the yaw angle. For this reason, for example, where the determined yaw angle θ is approximately equal to a mounting error, the deviation evaluation is not carried out unless the lane offset amount exceeds the threshold. This prevents the deviation warning from being activated more than necessary where the yaw angle has error. When there is a large lane deflection, it becomes feasible to perform the deviation evaluation independent of the vehicle position. Furthermore, since the deviation evaluation can be performed using the lane offset, i.e., the distance to a line (the distance from the center of the driving lane) even with error in the yaw angle, it is feasible to lower the risk of delay of the deviation warning.

When the mask processor 13 determines that the mask process conditions are not met in this way, the deviation evaluator 14 compares the lane future position outputted from the driving lane recognizer 12, with the vehicle future position outputted from the mask processor 13. The comparison between the lane future position and the vehicle future position is made according to Eqs (7) to (10) below. The description below will be given on the assumption that the right side of the vehicle is positive and the left side negative.

$$X\_lag < XL\_now \quad (7)$$

$$X\_lag < \mathit{XL}\_lag + \mathit{XL}\_now \quad (8)$$

$$X\_lag > XR\_now \quad (9)$$

$$X\_lag > \mathit{XR}\_lag + \mathit{XR}\_now \quad (10)$$

When the deviation evaluator 14 determines that at least one out of Eqs (7) to (10) above is satisfied, it determines that the host vehicle will deviate from the lane, and outputs a predetermined deviation warning signal to the steering torque applier 5, to the warning buzzer 6, and to the meter 7 (S6). On the other hand, when the deviation evaluator 14 determines that any of Eqs (7) to (10) above is not met, it terminates the control, without outputting the deviation warning.

As described above, the apparatus of the present embodiment is configured to perform the mask process, prior to the evaluation on whether the deviation warning is to be activated. This mask process is arranged to use both the yaw angle and the lateral position of the host vehicle. When the yaw angle and the lateral position both are not more than their respective predetermined thresholds, the deviation evaluation is not performed. Only when either of the yaw angle and the lateral position exceeds the corresponding threshold, the evaluation on the activation of the deviation warning is performed. Therefore, the deviation warning can be prevented from being activated more than necessary even if the yaw angle has error.

The above described the preferred embodiment of the present invention, but it is noted that the present invention is by no means intended to be limited to the above embodiment. For example, the lateral position of the lane can also be determined, for example, by using an absolute offset amount from the hypothetical center line in FIG. 5 or using a relative offset rate from the hypothetical center line obtained by dividing the offset amount by the lane width. Furthermore, it is also possible to use an absolute distance to a nearer boundary-line determined by subtracting the vehicle width from the lane width, dividing the difference by 2, and subtracting the offset amount from half of the difference.

The above embodiment used the fixed values as the yaw angle threshold and the threshold for the lateral position of the vehicle, but these thresholds can be variable thresholds according to the vehicle speed. Where the variable thresholds are adopted, it is preferable to adopt a mode in which the thresholds are increased with increase of the vehicle speed and in which the mask process is carried out even if the vehicle is located somewhat distant from the boundary-line.

Furthermore, the above embodiment was arranged not to perform the warning process after execution of the mask process, but it is also possible to adopt a mode in which the deviation warning is activated when a state of the host vehicle on a boundary-line is detected by another detector or the like, for example, even after execution of the mask process.

What is claimed is:

1. An apparatus for estimating of deviation from a lane comprising course prediction means for predicting course of a host vehicle in future, driving lane recognition means for recognizing a driving lane on which the host vehicle is running, and deviation estimating means for estimating a possibility that the host vehicle will deviate from the driving lane on the basis of a relation between the predicted future course of the host vehicle and the recognized driving lane, the apparatus further comprising:

yaw angle detector for determining a yaw angle of the host vehicle relative to the recognized driving lane;

lateral position detector for determining a lateral position of the host vehicle on the recognized driving lane; and prohibiting means for prohibiting the deviation estimating means from estimating the possibility of the deviation from the lane when an absolute value of the determined yaw angle is less than a predetermined threshold and when a distance between the determined lateral position and a center line of the driving lane is less than a predetermined threshold.

2. The apparatus according to claim 1, wherein at least one of the threshold for the determination on the yaw angle and the threshold for the distance to the center line of the driving lane in the prohibiting means is increased with increase of a vehicle speed.

3. The apparatus according to claim 1, further comprising warning means for, when the deviation estimating means estimates that the vehicle will deviate from the lane with a high possibility, notifying a driver of the possibility.

4. The apparatus according to claim 1, further comprising deviation avoidance means for, when the deviation estimating means estimates that the vehicle will deviate from the lane with a high possibility, applying a predetermined steering torque in a direction to avoid the deviation of the vehicle, to a steering wheel.

5. A method for estimating of deviation from a lane comprises the steps of predicting a course of a host vehicle in future, recognizing a driving lane on which the host vehicle is running, and estimating a possibility that the host vehicle will deviate from the driving lane on the basis of a relation between the predicted course of the host vehicle and the recognized driving lane, the method further comprising the steps of:

determining a yaw angle of the host vehicle relative to the recognized driving lane;

determining a lateral position of the host vehicle on the recognized driving lane; and prohibiting the estimation on the possibility of the deviation when an absolute value of the determined yaw angle is less than a predetermined threshold and when a distance between the determined lateral position and a center line of the driving lane is less than a predetermined threshold.

6. The method according to claim 5, wherein at least one of the threshold for the determination on the yaw angle and the threshold for the distance to the center line of the driving lane in the prohibiting step is increased with increase of a vehicle speed.

7. The method according to claim 5, further comprising a step notifying a driver about the possibility of the deviation when it is estimated that the vehicle will deviate from the lane with a high possibility.

8. The method according to claim 5, further comprising a step of applying a predetermined steering torque to a steering wheel in a direction to avoid the deviation of the vehicle when it is estimated that the vehicle will deviate from the lane with a high possibility.

* * * * *